United States Patent [19]

Lang et al.

[11] Patent Number: 5,621,577
[45] Date of Patent: Apr. 15, 1997

[54] EXTERNAL REAR-VIEW MIRROR FOR COMMERICAL VEHICLES

[75] Inventors: Heinrich Lang, Ergershiem; Wolfgang Seiboth, Bad Windsheim, both of Germany

[73] Assignee: Mekra Rangau Plastics GmbH & Co. KG, Germany

[21] Appl. No.: 132,720

[22] Filed: Oct. 6, 1993

Related U.S. Application Data

[63] Continuation-in-part of Ser. No. 956,782, Oct. 5, 1992, abandoned, which is a continuation-in-part of Ser. No. 675,670, Mar. 27, 1991, abandoned.

[30] Foreign Application Priority Data

| Mar. 29, 1990 | [DE] | Germany | 40 10 083.9 |
| Oct. 2, 1992 | [DE] | Germany | 42 33 255.9 |
| May 25, 1993 | [DE] | Germany | 43 17 314.4 |

[51] Int. Cl.⁶ .............................. G02B 7/182; B60R 1/06
[52] U.S. Cl. .................. 359/872; 359/877; 359/881; 248/479
[58] Field of Search ............................. 359/850, 855, 359/865, 872, 874, 876, 877, 881; 248/479, 480, 481, 484, 485, 488, 900

[56] References Cited

U.S. PATENT DOCUMENTS 3,609,014  9/1971  Kurz, Jr. ........................ 359/874
5,031,871  7/1991  Ohta et al. .
5,115,352  5/1992  Do Espirito Santo ............ 359/865
5,137,247  8/1992  Lang et al. ...................... 248/900

FOREIGN PATENT DOCUMENTS 8807152  11/1988  Germany ........................ 359/877
0135344  7/1985  Japan ............................. 359/877
0164638  6/1989  Japan ............................. 359/877

*Primary Examiner*—Ricky D. Shafer
*Attorney, Agent, or Firm*—Laff, Whitesel, Conte & Saret, Ltd.

[57] ABSTRACT

An external rear-view mirror for trucks has a housing, in which at least one adjustable mirror glass and an electrically or manually actuatable positioning aggregate for pivoting the mirror glass relative to the housing are arranged. Furthermore, a clamping device is provided to secure a support arm. In order to keep the vibrations of the mirror glass as little as possible, a support plate is provided in the housing and is directly secured to the clamping device. The at least one positioning aggregate, on which the mirror glass is in turn arranged, is secured to the support plate on the other side. The housing is only connected with the support plate; it has no supporting function.

10 Claims, 9 Drawing Sheets

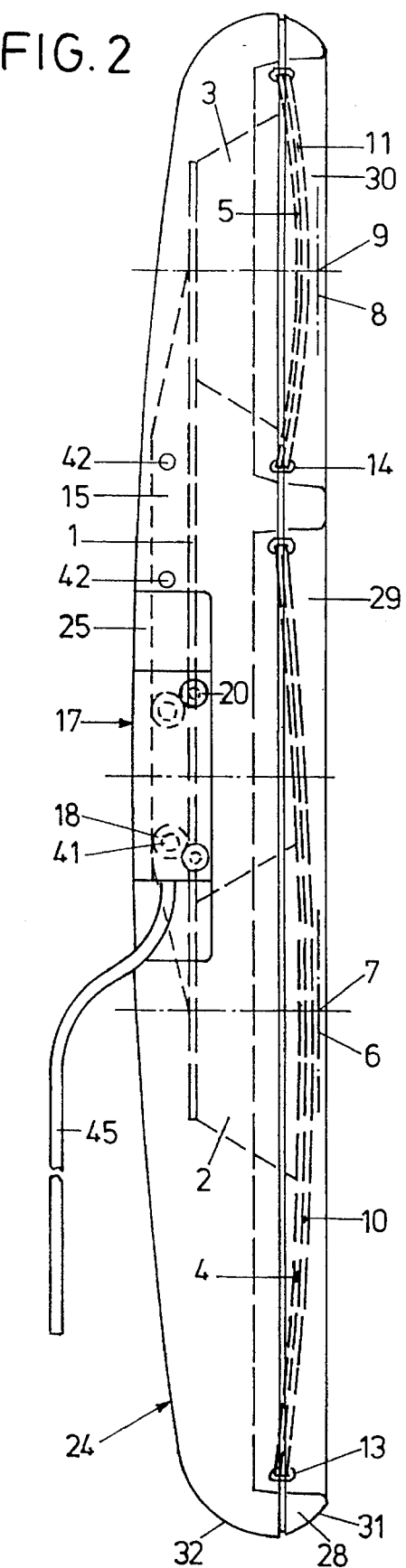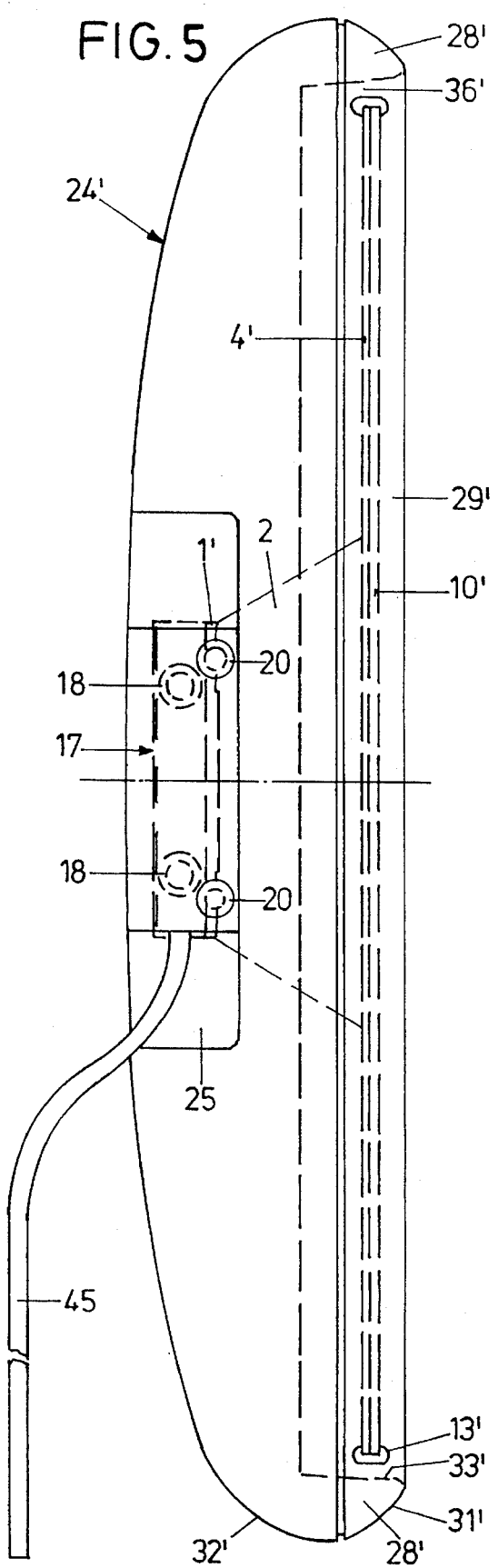

EXTERNAL REAR-VIEW MIRROR FOR COMMERICAL VEHICLES

This is a continuation-in-part of our continuation-in-part application Ser. No. 07/956,782 filed Oct. 5, 1992, now abandoned, which is a continuation-in-part of our application Ser. No. 07/675,670 filed Mar. 27, 1991, now abandoned, without prejudice in favor of the present application.

BACKGROUND OF THE INVENTION

1. Field of the Invention

The invention relates to an external rear-view mirror for commercial vehicles comprising a housing, at least one pivotable mirror glass arranged in the housing, a positioning aggregate for pivoting one mirror glass relative to the housing and a holding device for fastening a holder.

2. Background Art

External rear-view mirrors for commercial vehicles of the generic type, which are as a rule very large, are exposed to the air stream, whereby the use of the mirror is made very difficult, in particular when the mirror glass is exposed to vibrations. Furtheron such mirrors are often very complex in their construction, so they need to be simplified in order to reduce the expenditure for their production and assembly.

SUMMARY OF THE INVENTION

It is an object of the invention to embody an external rear-view mirror for commercial vehicles of the generic kind in such a way that the risk of vibration is reduced as far as possible.

It is another object of the invention to embody an external rear-view mirror for commercial vehicles in such a way that its construction is simplified and even improved concerning the stability of the mirror against vibrations.

Both the above-mentioned objects are achieved by an external rear-view mirror for commercial vehicles comprising a holder for securing the mirror to the commercial vehicle, a support plate arranged in the housing, which is secured to the holder by means of a holding device and on which the housing is held, at least one mirror glass, which is pivotably supported on the support plate and which is arranged on the housing, and at least one positioning aggregate, which is arranged on the support plate and which is connected with the at least one mirror glass for its pivoting, wherein the holding device is formed as a clamping device, of which the clamping thrust bearing for the holder is formed in one piece with the support plate and of which the clamping member is non-positively connectable with the clamping thrust bearing.

Due to the fact that the holding device is formed as a clamping device, of which the clamping thrust bearing for the holder is formed in one piece with the support plate and of which the clamping member is non-positively connectable with the clamping thrust bearing, the support plate is directly connected with the holder of the external rear-view mirror. In this way, there are no other intermediate connecting parts embodied separatelyfrom the support plate between the support plate and the holder apart from the clamping member, which essentially improves the stability of the connection between the support plate and the holder. In addition, with regard to manufacturing requirements, only one single connection between the support plate and the holder must be made, which considerably reduces the assembly expenditure.

When the housing is connected with the support plate or the holding device or the holder, respectively, then the housing is only used as an aerodynamically favorable coating and a stylistic element. When the housing is clampingly held between the holding device and the support plate, any additional mounting means to secure the housing to the support plate are rendered unnecessary. This development also makes possible further advantageous measures according to which the holding device is arranged in a recess of the housing and the outside contour of the holding device is in alignment with the external surface of the housing, whereby on the one hand the holding device largely disappears optically, while becoming aerodynamically particularly favorable in structure on the other hand.

When the housing has no supporting functions, it may have especially thin walls. For reasons of manufacturing technique, aerodynamics and safety of operation, it is in this case of special advantage, if the housing has a covering frame surrounding the at least one mirror glass and having an internal wall section leaving a gap towards the mirror glass. This ensures that, in spite of the mirror glasses being adjustable relative to the housing, its inner chamber is closed as tight as possible.

The measures according to the invention allow to provide two mirror glasses, of which the one and as a rule larger mirror glass serves as a normal rear-view mirror, whereas the smaller mirror glass serves as a wide-angle mirror for a wider panoramic view. When the housing has a main axis of symmetry and a secondary axis of symmetry extending at right angles to it, and when the support plate is connectable with the holder in two positions, an exchange of the different mirrors, i.e. of their different arrangement, is possible without any modification of components.

As a rule the positioning aggregates are electromotive; they may, however, also be formed such that manual pivoting of the mirror glass is possible. Both kinds of positioning aggregates are known and commercial.

Further advantages, features and details of the invention will become apparent from the ensuing description of examples of embodiment taken in conjunction with the drawing.

BRIEF DESCRIPTION OF THE DRAWING

FIG. 2 shows a side view of the mirror according to FIG. 1 without a support arm, FIG. 5 shows a side view of an external rear-view mirror without support arm with only one mirror glass in a second embodiment.

DESCRIPTION OF THE PREFERRED EMBODIMENTS

Figure 1:
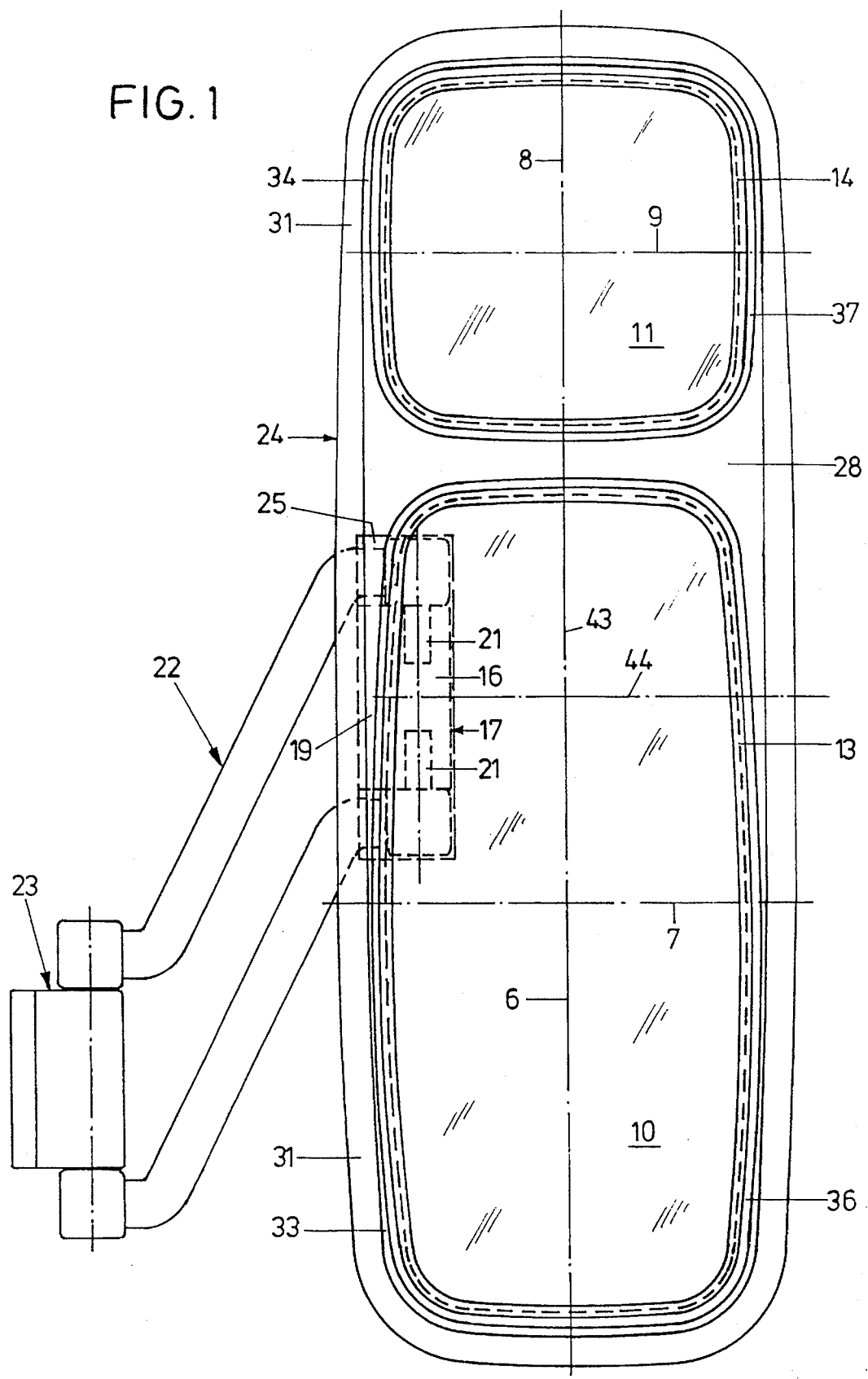
FIG. 1 shows a top view of an external rear-view mirror according to the invention in a first embodiment.
Figure 3:
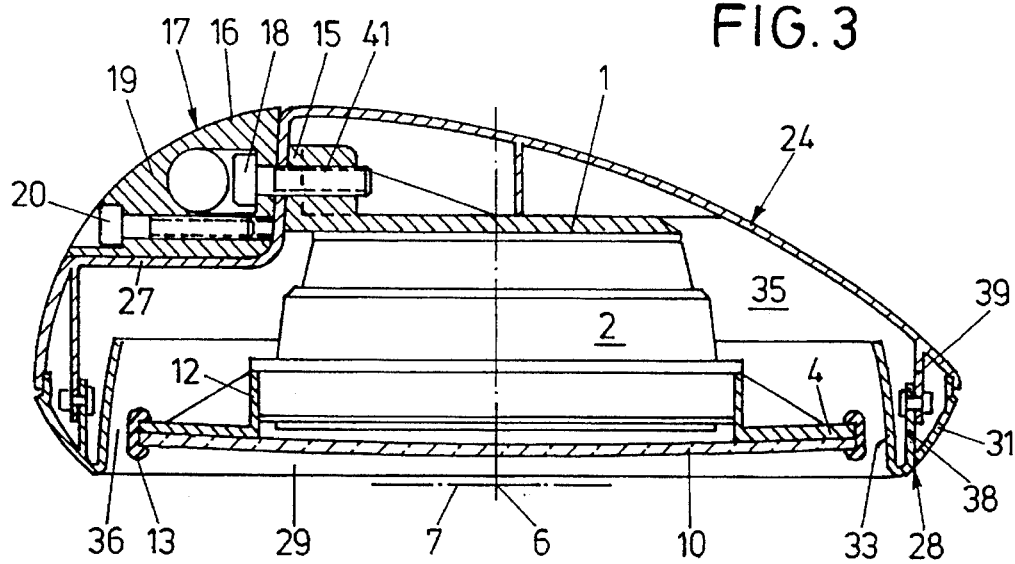
FIG. 3 shows a cross-section through the mirror according to FIGS. 1 and 2 in the vicinity of the larger, lower mirror glass.

The external rear-view mirror for a commercial vehicle shown in FIGS. 1 to 4 is formed as a double mirror. It has a support plate 1 as a central support element. Two positioning aggregates 2, 3 are arranged on this support plate 1, which are known and commercial. The positioning aggregates are of the type comprising two electric geared motors, by means of which a mirror support plate 4 or 5, respectively, provided on the positioning aggregate 2 or 3, respectively, may be pivoted about two positioning axes 6, 7 or 8, 9, respectively, to carry out an adjustment of the mirror glass 10 or 11, respectively, arranged on the mirror support plate 4 or 5, respectively. Instead of such electric positioning aggregates 2, 3 manually adjustable units may be provided which are equally known and commercial and in the case of which the positioning is made manually about the positioning axes 6, 7 or 8, 9, respectively.

The mirror support plates 4 or 5, respectively, are secured to the positioning aggregates 2 or 3, respectively, by means of an annular fastening edge 12 through shrinking, locking, gluing or the like. The mirror glasses 10, 11 are retained on the respective mirror support plates 4 or 5 by means of an elastic retaining ring 13, 14 enclosing the edges of the support plates, 4 or 5, respectively, and of the mirror glass 10 or 11, respectively. As can be seen from FIGS. 2 and 3, on the one hand, and 2 and 4, on the other hand, the mirror glasses 10, 11 are convex and of different curvatures. The smaller mirror glass 11, which is the upper mirror glass in FIG. 2, is more curved and thus produces a wider view than the lower, larger and less curved mirror glass 10.

The support plate 1 has a retaining web 15 projecting at right angles from it and to which is secured an abutment 16 of a retaining device formed as a clamping device 17 by means of two screws 18. A clamping jaw 19 is associated with the abutment 16 and can in turn be secured to the abutment 16 by means of two clamping screws 20. The clamping jaw 19 and the abutment 16 form the clamping device 17. Two pivots 21 of a double-armed support arm 22 serving as a holder are retained between the abutment 16 and the clamping jaw 19; the other end of the double-armed support arm 22 is supported on a pillow block 23 to be in turn secured to the cabin of a commercial vehicle.

The double-armed support arm 22 is a mirror support holder, which is fastened to the holding device 17 and which is the basic support element of a support link being realized by the stable connection between the support arm 22, the holding device 17 and the support plate 1, 1'. By this support link the risk of vibration is largely decreased, as vibrations of a housing 24, 24' are not transmitted to the mirror due to the stable support of the mirror by said support link.

The mirror has such a housing 24, of which the cross-section corresponds about to that of a supporting wing. In the vicinity of the clamping device 17 this housing 24 has a recess 25, of which the cross-section is adapted to the cross-section of the clamping device 17. In cross-section this recess 25 is defined by a support wall 26 corresponding to the direction of the retaining web 15 and by a wall section 27 extending approximately at right angles to the support wall 26. The support wall 26 bears against the retaining web 15 and is clamped between the latter and the abutment 16 by means of the screws 18. As show FIGS. 3 and 4, the outside contour of the clamping device 17 is adapted to the outside contour of the housing 24, i.e. the clamping device 17 is aerodynamically integrated in the outside contour of the housing 24. On its side facing the mirror glasses 10, 11, the housing 24 is covered by a covering frame 28 having openings 29, 30 receiving the mirror glasses 10 or 11. The frame 28 has an external wall section 31 engaging with the circumferential edge 32 of the housing 24 and which is bent inwards, i.e. towards the mirror glasses 10, 11. In the vicinity of each opening 29, 30 this external wall section 31 is followed by an internal wall section 33, 34 projecting into the inner chamber 35 of the housing 24. As show FIGS. 3 and 4, the contour of such a wall section is in each case such that a small gap 36 or 37 forms between the internal wall section 33 and the associated mirror glass 10 and between the internal wall section 34 and the associated mirror glass 11, so that even when the respective mirror glass 10 or 11 is moved about the positioning axes 6, 7 or 8, 9, the inner chamber 35 is largely closed, i.e. only the mentioned gap 36 or 37 is left free. This protects the inner chamber 35 of the housing 24 and the positioning aggregate 2 or 3 arranged in it from becoming dirty.

Moreover, this leads to aerodynamically favorable conditions. As show FIGS. 3 and 4, this covering frame 28 is secured by means of retaining strips 38 to correspondingly arranged and structured ribs 39 of the housing 24, for example by rivets 40.

The mirror support plates 4, 5 with the corresponding mirror glasses 10, 11 may also be provided in a reverse arrangement, i.e. in such a case the smaller and more strongly curved mirror glass 11 is arranged at the bottom and the larger and less curved mirror glass 10 is arranged at the top. This is easy to realize among others due to the fact that the positioning aggregates 2 and 3 are identical. In order to realize this without any other change of the housing 24, the support plate 1 is arranged in a correspondingly lower position, to which effect a set of threaded holes 42 is provided further above in addition to the threaded holes 41 receiving the screws 18. In such a case the covering frame 28 only has to be put on rotated by 180° for assembly. This is easy to realize because the housing 24 is provided double symmetrical in the vicinity of the mirror glasses 10, 11, as FIG. 1 shows; i.e. it has a main axis of symmetry 43 and a secondary axis of symmetry 44 with the result that the covering frame 28 can be rotated about the point of intersection of the two axes 43, 44 in FIG. 1 by 180° and it can then equally be connected with the housing 24.

Figure 4:
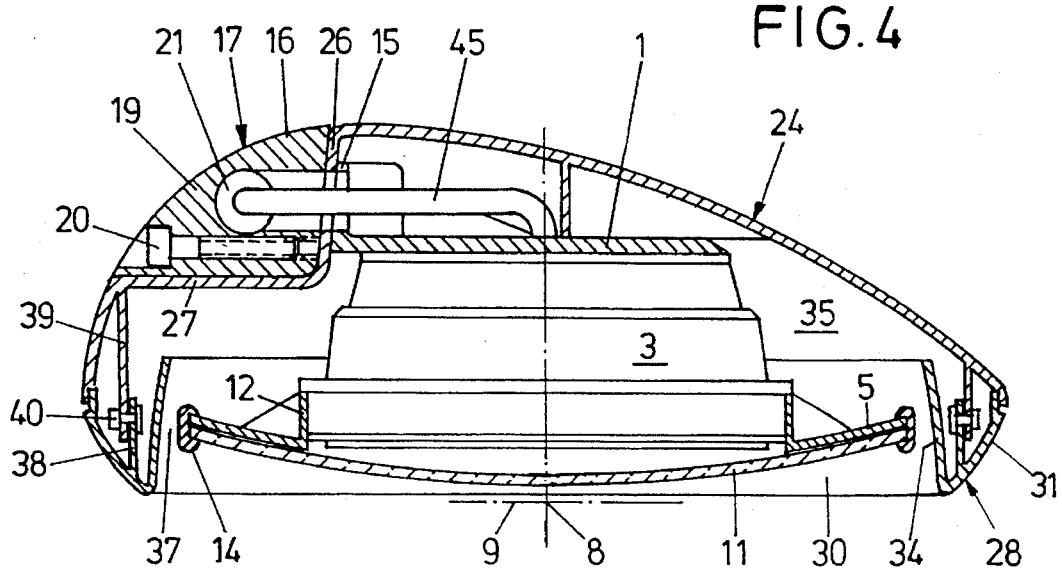
FIG. 4 shows a cross-section through the mirror according to FIGS. 1 and 2 in the vicinity, of the smaller, upper mirror glass.

As can be seen from FIGS. 2 and 4, a multi-core electric line 45 is introduced through the clamping device 17 into the housing 24. Via this line 45 the electric current supply of the positioning aggregates 2, 3 takes place, to the extent these comprise electric geared motors, and they ensure the electric supply of possibly provided heatings of the mirror glasses 10, 11. From the outside this electric line 45 is piloted through the support arm and introduced via a hollow pivot 21 into the housing 24.

FIG. 5 shows a mirror with only one mirror glass 10'. The housing 24' is as a consequence only formed to receive one mirror glass 10'. The structure corresponds to that shown in FIG. 3 and to what is described regarding FIG. 3, to which is referred in this respect. In the example of embodiment according to FIG. 5 the mirror glass 10' is not shown to be curved, but plane, which is, however, of no importance in the present case. All the other components shown in FIG. 5 have identical reference numerals to the extent they are identical with the components of FIGS. 1 to 4; to the extent they are identical in function but differ in construction, they have identical reference numerals provided with a prime. A renewed description therefore is not necessary.

The external rear-view mirror for a commercial vehicle illustrated in two different embodiments in FIGS. 6 to 9 is configured as a manually (FIG. 6, 8) or motor adjustable (FIG. 7, 9) external rear-view mirror. Both embodiments have the following in common:

A support plate 51, 51' oriented to be substantially vertical and parallel to the main plane of the mirror glass 52 of the external rear-view mirror is provided as the central supporting element of the two external rearview mirrors. A retaining device 53 for the attachment of the external rear-view mirrors on a support arm 54 (shown in a dashed line) is provided on the rear of the support plates 51, 51' facing away from the mirror glass 52 and in the direction of motion F. The support arm 54 leads to the body of the commercial vehicle where is is secured in a corresponding pillow block (not shown). The retaining device 53 consists of two clamping thrust bearings 55 arranged in alignment with each other in the vertical direction and formed in one piece with the support plate 51, 51'. Further, a clamp 56 is provided as a clamping member on each clamping thrust bearing 55 and is non-positively connectable with the associated clamping thrust bearing 55 by means of the screws 57. The clamping thrust bearings 55 are integrated into the upper side of a flat cuboidal projection 58 and form the free end of this projection 58 protruding from the plane 59 of the support plate 51, 51'.

On the side facing the mirror glass 52, the support plate 51, 51' is provided with a positioning aggregate for the pivotable and manually or motor adjustable positioning of the mirror glass 52. In the embodiment shown in FIGS. 6 and 8, the positioning aggregate consists of a pivot bearing 60 formed as a ball-and-socket joint still to be specified below.

Figure 7:
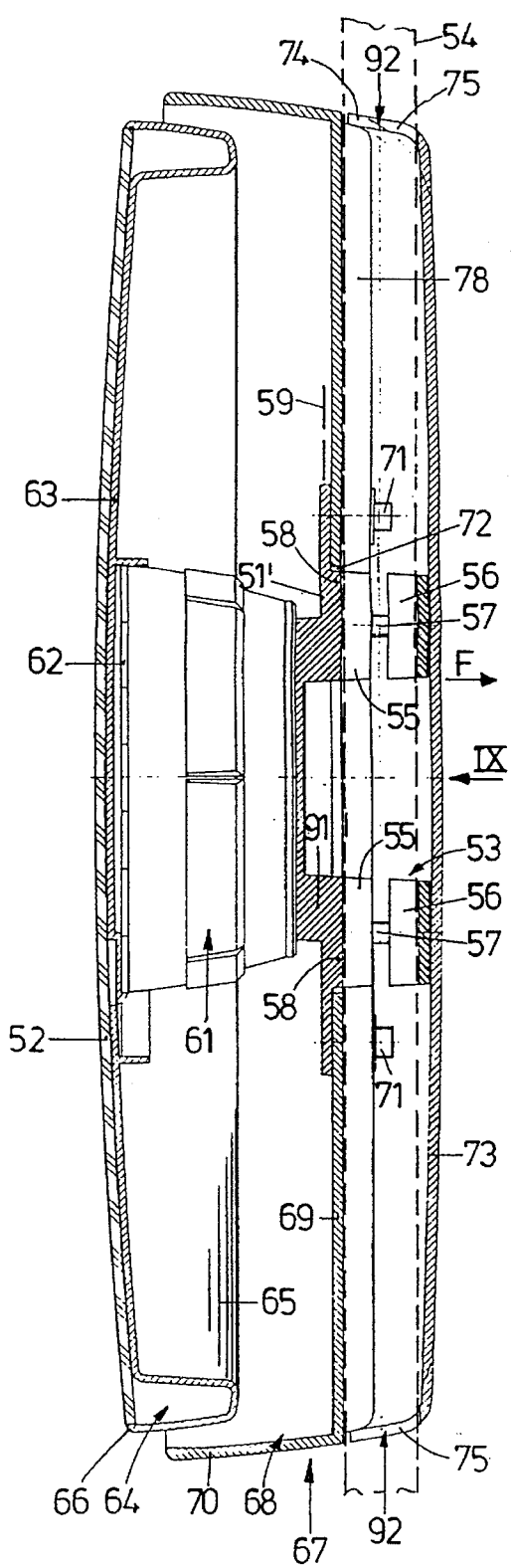
FIG. 7 is a vertical section, analogous to FIG. 1, through a second embodiment of an external rear-view mirror.
Figure 9:
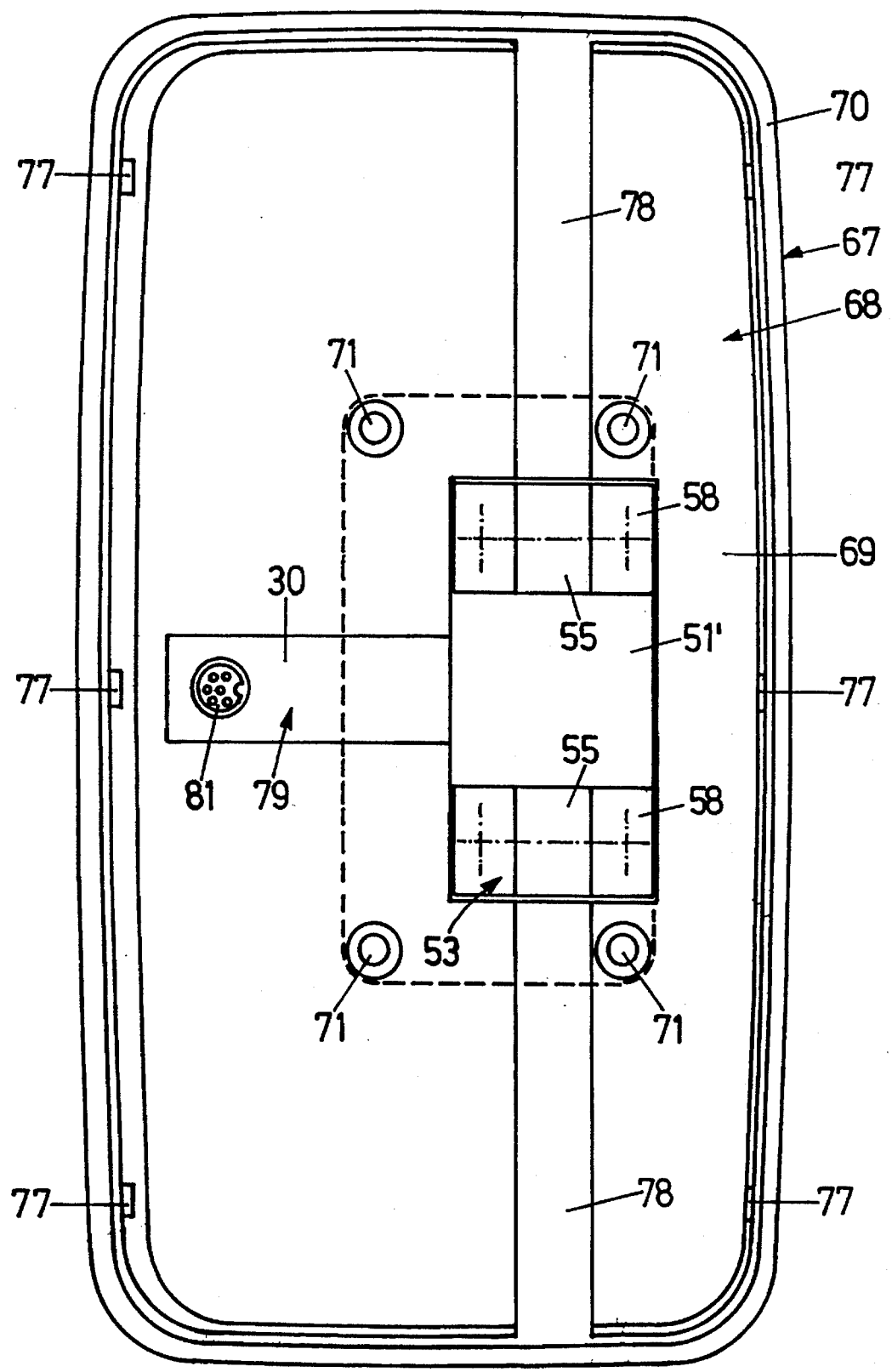
FIG. 9 is a view of the external rear-view mirror seen from the direction of the arrow IV in FIG. 2 without clamps and cover.

In the embodiment shown in FIGS. 7 and 9 the positioning aggregate is an encapsulated pivot module 61, into which motor drives and a corresponding pivot mechanism are integrated. This pivot module 61 is a commercially available piece requiring no detailed explanation.

In a direction towards the mirror glass 52 the positioning aggregates (pivot bearing 60, pivot module 61) of the mirror embodiments shown in FIGS. 6 to 9 have a mirror support plate 62, onto which a retaining plate 63 for the mirror glass 52 is slipped and arrested by means of a positive clamping connection. This positive clamping connection between the retaining plate and the mirror support plate is specified in detail in German patent application P 43 02 950.7 to which reference is made.

Along its rim the retaining plate 63 is provided with a convexity 64 facing away from the mirror glass 52 and forming a blind-type surrounding collar 65. The front edge 66 of the retaining plate 63 encircles the mirror glass 52 which is arrested on the retaining plate 63 for instance by gluing.

The housing 67 of the mirror identically formed in the two embodiments according to FIGS. 6, 8 and 7, 9, respectively, is of two-piece structure and comprises a shell-type housing member 68 having a base 69 forming the bottom of the shell and a wall 70 projecting therefrom about at fight angles against the direction of motion. The wall 70 extends in the way of a frame and defines the pivoting range of the mirror glass 52. From the side facing away from the mirror glass 52 the housing member 68 is secured by screws 71 to the support plate 51, 51', the two clamping devices consisting of the clamping thrust bearing 55 and the clamp 56 passing through an opening 72 of the base 69 by means of the projection 58. Thus, the clamping devices are arranged on the rear of the base facing away from the mirror glass 52.

Further, the housing 67 has an equally shell-type cover 73 serving for covering the base 69 of the housing member 68 and the clamping device arranged upstream thereof. From the side facing away from the mirror glass 52 the cover 73 is lockable onto the housing member 68. To this end the cover 73 is provided with locking projections 76 on the front edge 74 of its surrounding side wall 75; the locking projections 76 engage with corresponding locking openings 77 on the housing member 68.

By reason of the association with and the attachment to each other, of the support plate 51, 51', of the clamping devices arranged thereon, of the housing member 68 and of the cover 73, the external rear-view mirrors according to FIGS. 6 to 9 are especially convenient to assemble, since the application of the housing member 68 to the support plate 51, 51', the latter's connection with the support arm 54 and the locking on of the cover 73 can take place successively from one direction, namely from the side facing away from the mirror glass 52.

The base 69 of the shell-type housing member 68 further has a conduit-like recess 78 on its rear facing away from the mirror glass 52 which recess 78 extends in the vertical direction over the entire height of the base 69 and in alignment with the clamping thrust bearings 55 of the holding device 53. In the position of assembly this recess 78 partially accommodates the support arm 54.

At right angles to the recess 78, an integrated cable duct 79 for a control cable (not shown) is provided proceeding from the opening 72 in the base 69 of the housing member 68. At the end of the cable duct 79 facing away from the opening 72, an electric plug connector 81 is arranged in the bottom 80 of the cable duct 79, so that during the assembly of the mirror a pre-fitted control cable exiting for instance from the support arm 54 between the two clamping devices can be placed in the cable duct 79 and can be connected by a corresponding plug with the plug connector 81. Here, too, the assembly from the side facing away from the mirror glass is ensured. From the plug connector 81 corresponding control cables can lead to the pivot module 61.

Moreover, a passage opening 92 for the support arm 54 is provided in the upper and lower side wall 75 of the cover 73 to be in vertical alignment with the recess 78 in the housing member 68.

Figure 10:
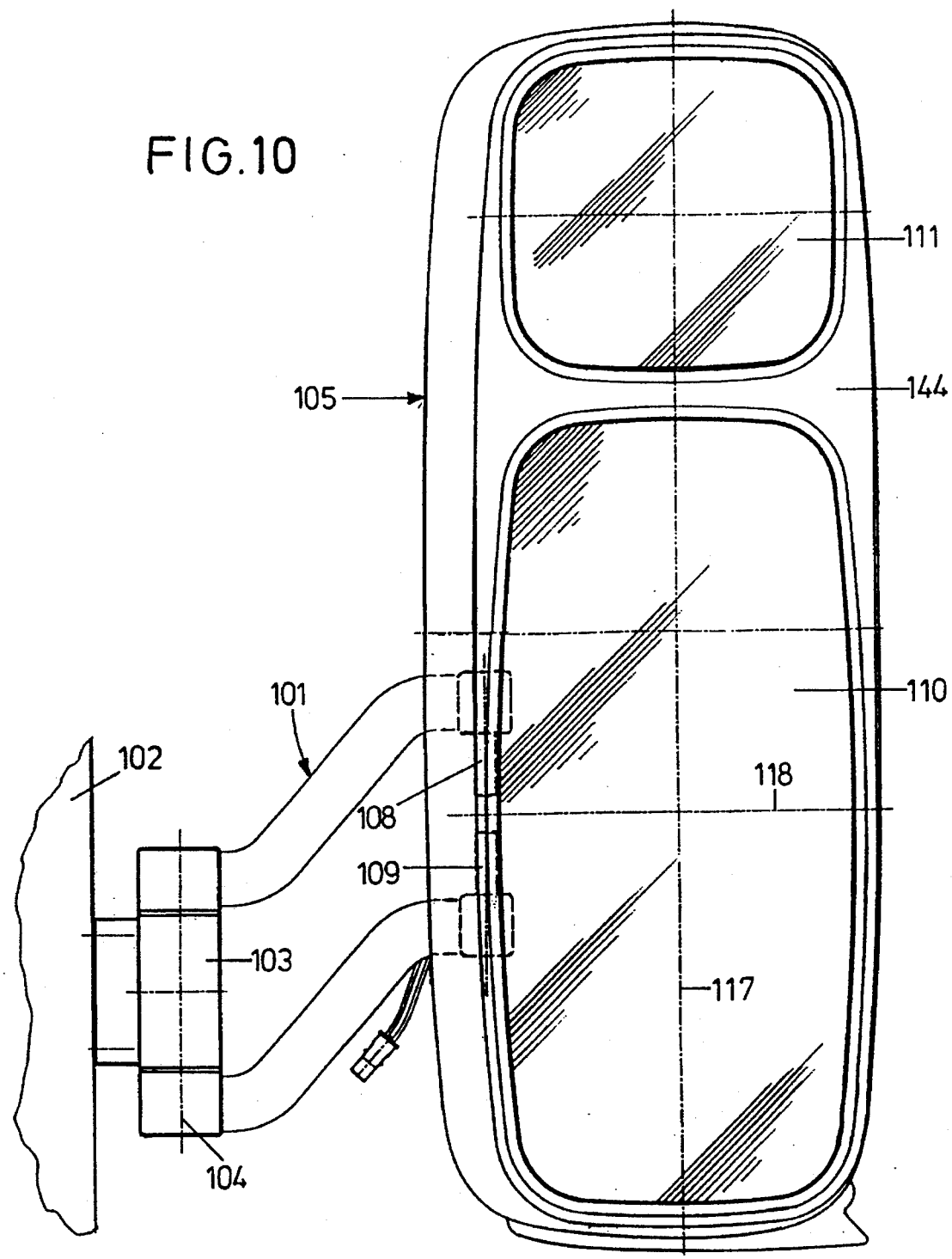
FIG. 10 shows a top view of an external rear-view mirror according to the invention in a fifth embodiment.
Figure 11:
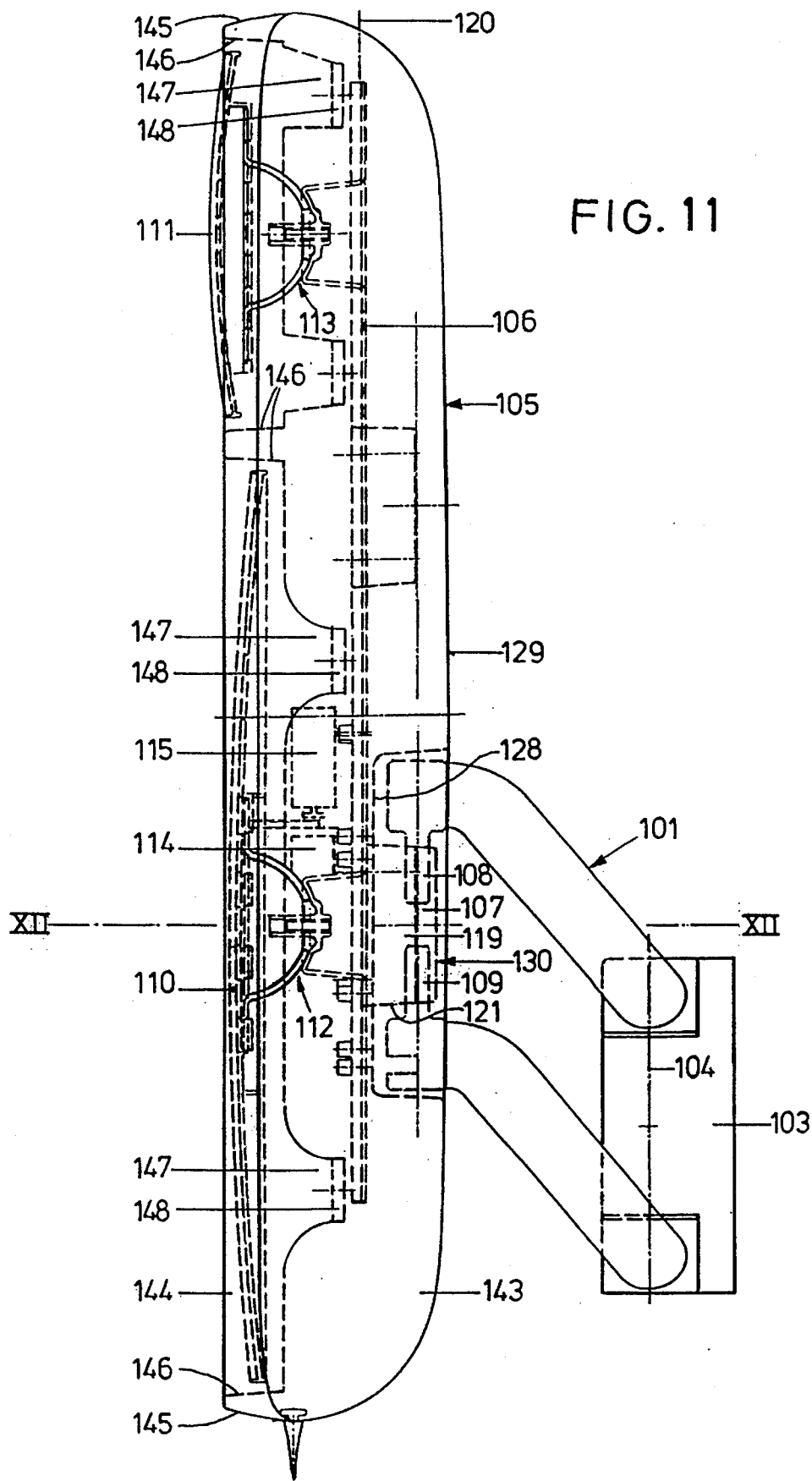
FIG. 11 shows a side view of the mirror according to FIG. 10
Figure 12:
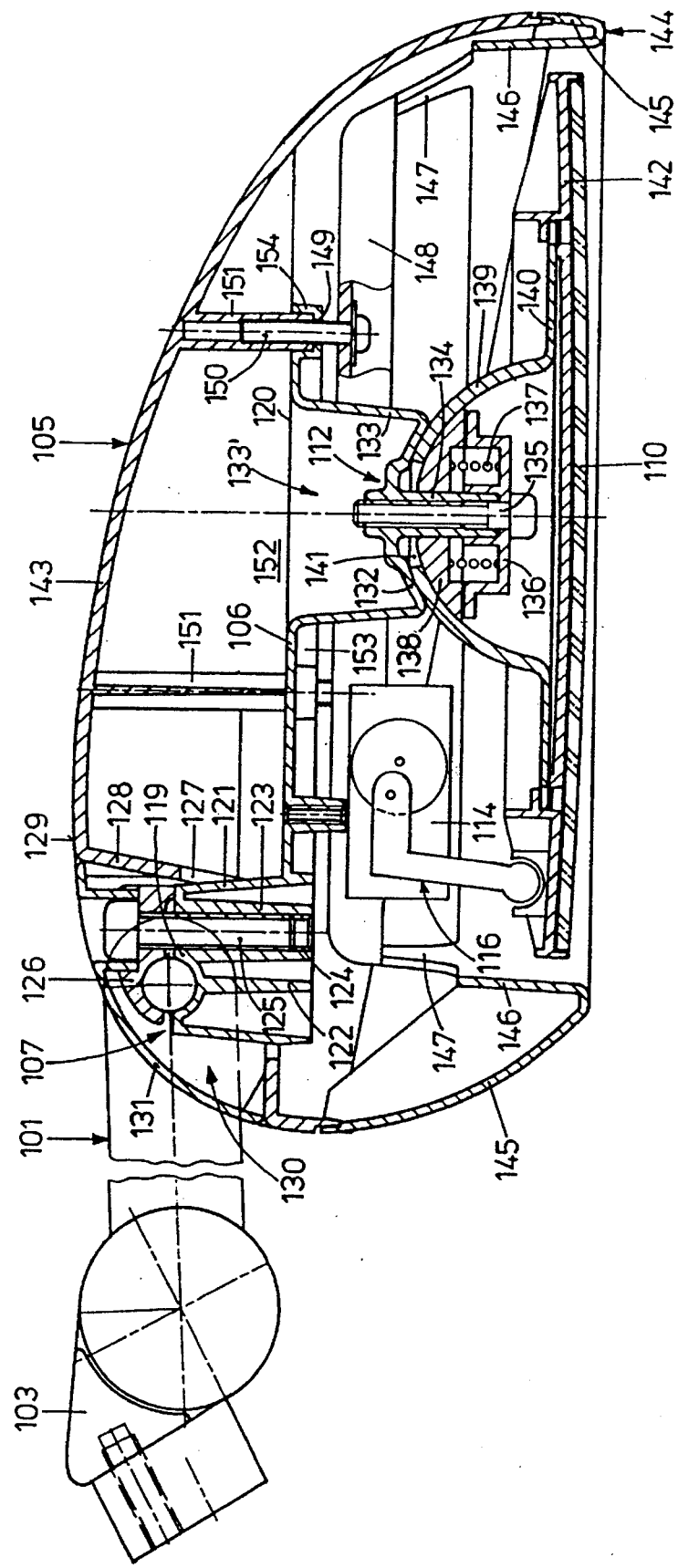
FIG. 12 shows a cross-section through the mirror according to FIGS. 10 and 11 along the line XII—XII according to FIG. 11.

The external rear-view mirror shown in FIGS. 10 to 12 for a commercial vehicle is formed as a double mirror. It comprises a holder formed as a double-armed support arm 101 for securing the mirror to a car body part 102 of a commercial vehicle, which is diagrammatically outlined in FIG. 10. On the side of the car body the double-armed support arm 101 is supported on a pillow block 103 pivotably around a vertical axis 104.

In an aerodynamically formed housing 105 of the mirror a support plate 106 is disposed, which is secured to the two retaining pins 108, 109 at the free ends of the double-armed support arm 101 by means of a holding device 107. The housing 105 is directly held on this support plate 106. At appropriate places the support plate 106 may comprise recesses for the purpose of weight reduction, which are not shown in detail.

Furthermore two mirror glasses 110, 111 are pivotably supported on the support plate 106 each by means of a pivot bearing 112, 113 formed as a ball-and-socket joint. The lower mirror glass 110 represents the main mirror glass, which is only slightly curved, the upper mirror glass 111 is a smaller wide-angle mirror.

Two positioning aggregates 114, 115 in the form of electric geared motors are associated with the lower mirror glass 110 and are coupled with the mirror glass 110 via a slider-crank mechanism 116, respectively, which is outlined in FIG. 12. By means of the positioning aggregates 114, 115 the mirror glass 110 can be positioned about two positioning axes 117, 118, which are vertical in relation to each other, in order to carry out an adjustment of the mirror glass 110.

The holding device 117 is formed as a clamping device, of which the clamping thrust bearing 119 for the retaining pins 108, 109 of the support arm 101 are formed in one piece with the support plate 106. In this case the clamping thrust bearing 119 is arranged on the free end of an essentially cuboid-like projection 121, which projects from the plate plane 120 of the support plate 106, which projection 121 is hollow on its inner side and is reinforced by integrally formed stiffening ribs 122. In addition, a sleeve 123 is integrally formed on the projection 121 on its inner side, which sleeve 123 comprises an internal thread 124 for the fastening screw 125, which can be screwed in from outside, for the clamping jaw 126 forming the clamping member of the clamping device 107. By means of the fastening screw 125 the clamping jaw 126 can be non-positively connected with the clamping thrust bearing 119, whereby the support plate 106 is firmly connected with the retaining pins 108, 109 of the support arm 101 under the clamping lock of the clamping device.

In the position of assembly shown in FIG. 12 the projection 121 projects through a housing opening 127, which is arranged in the angular bottom 128 of a housing recess 130 arranged on the outside of the housing 129. Consequently, the clamping thrust bearing 119 and the clamping jaw 126 of the clamping device 107 are arranged on the outside of the housing 129 in the housing recess 130, and are thus accessible in an especially easy manner for a mutual assembly of mirror and support arm 101. The clamping device is covered towards the outside by a shrouding cover 131, which is arranged within the housing recess 130 and which is held by the fastening screw 125.

Figure 6:
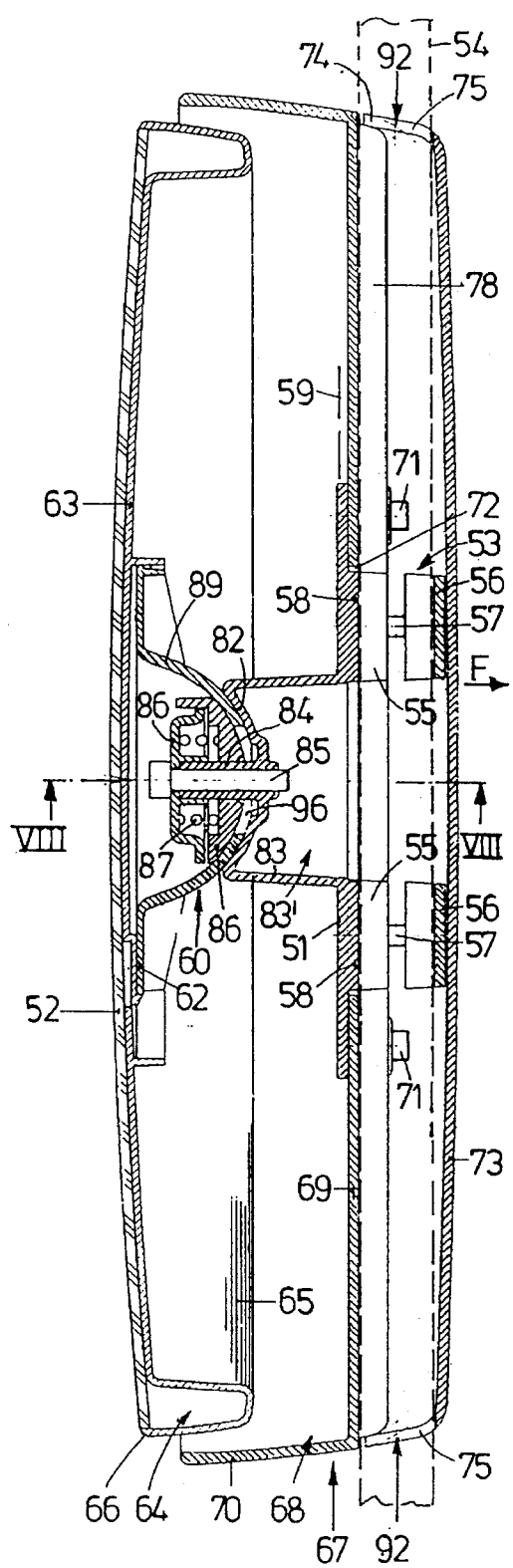
FIG. 6 is a vertical section through an external rear-view mirror in a first embodiment along the section line I—I in FIG. 3.
Figure 8:
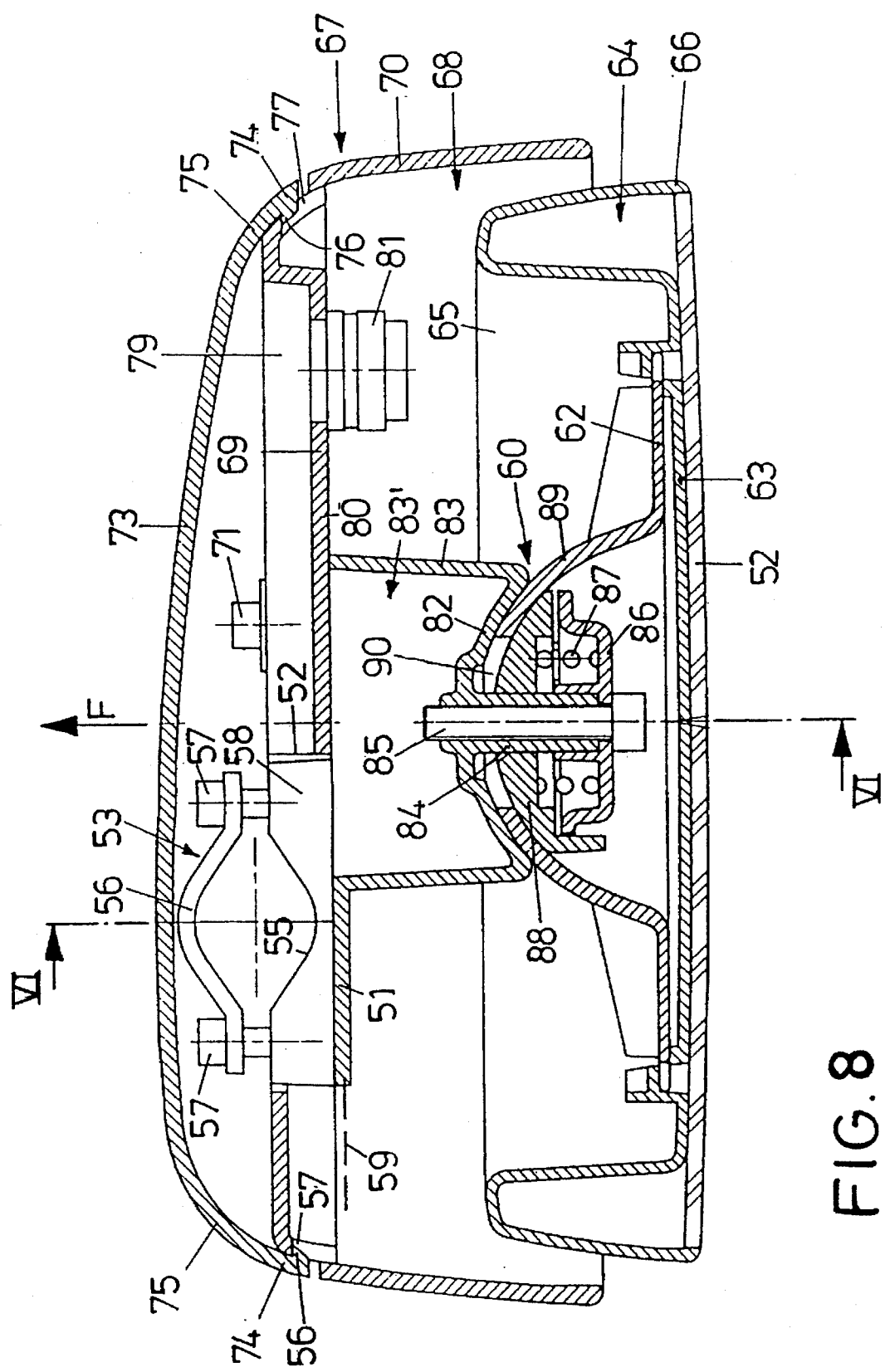
FIG. 8 is a horizontal section along the section line III—III in FIG. 1.

In the following the embodiments of the pivot bearing 60 and of the two pivot bearings 112, 113, respectively, are described taken in conjunction with FIGS. 6 and 8 and with FIG. 12, respectively. The latter shows the pivot bearing 112 associated to the lower mirror glass 110. The upper pivot bearing 113 is embodied accordingly.

The pivot bearing 60, 112 is embodied as a ball-and-socket joint on the support plate 51, 106, the bearing shell 82, 132 of the ball-and-socket joint being formed in one piece with the support plate 51, 106. In this case the bearing shell 82, 132 is arranged at the free end of an annular projection 83, 133, which projects from the plate plane 59, 120 of the support plate 51, 106. The projection 83, 133 with the bearing shell 82, 132 is formed as a hat-like convexity 83', 133' of the support plate 51, 106 and extends in the direction which is opposite to the projection 58, 121.

Centrally the bearing shell 82, 132 comprises a vertically projecting threaded sleeve 84, 134, which is also formed in one piece with the bearing shell 82, 132, into which threaded sleeve 84, 134 a fastening screw 85, 135 for an abutment cap 86, 136 seated on the threaded sleeve 84, 134 is screwed. A compression spring 87, 137 bears on the inner side of the abutment cap 86, 136, which compression spring 87, 137 drives a pressing element 88, 138 in the form of a spherical segment in the direction towards the bearing shell 82, 132 of the pivot bearing 60, 112. A hemispherical thrust bearing shell 89, 139 extends between the pressing element 88, 138 and the bearing shell 82, 132 and is formed on a plane retaining plate 63, 140 for the mirror glass 52, 110. The thrust bearing shell 89, 139 has a central opening 90, 141, through which the threaded sleeve 84, 134 passes with play.

By analog to the embodiment of FIGS. 6 to 9, the mirror of FIGS. 10 to 12 comprises a mirror support plate 142, which is secured to the retaining plate 140 in a detachable manner and with which the mirror glass 110 is permanently connected by gluing.

As becomes further clear by FIGS. 10 to 12, the housing 105 is formed in two parts from a housing main part 143 and a frame part 144 laterally surrounding the mirror glasses 110, 111. In this case the frame part 144 has an edge region 145 located on the outside as well as wall portions 146 located on the inner side flanking at a distance the edges of the mirror glass 110, 111. Integrally disposed connecting braces 147 extend from these wall portions 146 in the direction towards the support plate 106, which between their ends comprise one retaining web 148 each, extending parallel to the support plate 106. With these retaining webs 148 the frame part 144 is secured to fastening elements formed in one piece into the support plate 106 by means of a fastening screw 150. These fastening elements are openings 149 in the support plate 106, which are arranged in cup-like recesses. The fastening screws simultaneously retain the housing main part 143, in which the fastening screws 150 penetrate the openings 149 at the support plate 106, and engage with threaded sleeves 151 at the housing main part, which are formed in one piece with the housing main part 143. As a result the housing main part 143 and the frame part 144 are connected with each other and with the support plate 106 from the direction of the flat sides 152, 153 facing away from each other of the support plate 106. The support plate 106, the housing main part 143 and the frame part 144 are mutually connected with each other in the type of a sandwich construction.

As for the example of embodiment according to FIGS. 7 and 9, it remains to be said that the pivot module 61 is suitably arranged on a flat cylindrical projection 91 of the support plate 51'.

Regarding the assembly of the mirror glasses 52, 110, 111 and the associated positioning aggregates (pivot bearing 60, pivot module 61, pivot bearing 52, 112, 113, positioning aggregates 114, 115), it is worth mentioning that all the steps of assembling in this connection take place from the side of the support plate 51, 51', 106 facing towards the mirror glass 52, 110, 111. This, too, contributes to the convenience of assembly.

What is claimed is:

1. An external rear-view mirror for commercial vehicles comprising:

a holder (54) for securing the mirror to the commercial vehicle, a separate support plate (51, 51') arranged in a housing (67), said support plate (51, 51') is directly secured to the holder (54) by means of a clamping device (53) and said housing (67) is held on said support plate (51, 51'), at least one mirror glass (52), which is pivotably disposed on the support plate (51, 51') and which is arranged on the housing (67), and at least one positioning aggregate (60, 61), which is arranged on the support plate (51,51') and which is connected with the at least one mirror glass (52) for its pivoting wherein the clamping device (53) comprises a clamping thrust bearing (55) for the holder (54) and a clamping member (56), the clamping thrust bearing (55) for the holder (54) being formed in one piece with the support plate (51, 51') and the clamping member (56) being non-positively connectable with the clamping thrust bearing (55), and wherein the clamping device (53) has two clamping thrust bearings (55) integrally formed with the support plate (51, 51'), the clamping member (56) of which clamping thrust bearing (55) is non-positively connectable with the clamping thrust bearing (55).

2. An external rear-view mirror according to claim 1, wherein a housing member (68) laterally defining the pivoting range of the mirror glass (52) by a wall (70) extending in the way of a frame is arranged on the support plate (51, 51') and is secured to the support plate (51, 51') with a base (69) supporting the wall (70) from the side facing away from the mirror glass (52), the clamping device (53) on the support plate (51, 51') passing through an opening (72) in the base (69) and being arranged on the rear of the base (69) facing away from the mirror glass (52).

3. An external rear-view mirror according to claim 2, wherein on its rear facing away from the mirror glass (52) the base (69) of the housing member (68) is provided with a conduit-like recess (78) for the at least partial accommodation of the holder (54).

4. An external rear-view mirror according to claim 2, wherein on its rear facing away from the mirror glass (52) the base (69) of the housing member (68) is provided with a cable duct (79) for a control cable, which duct (79) proceeding from the portion of the base adjacent to the clamping device (55, 56) leads to an electric plug connector (81) arranged thereon.

5. An external rear-view mirror according to claim 1, wherein a cover (73) for covering the at least one clamping device (53) and the base (69) of the housing member (68) is connected to, in particular locked onto the housing member (68) from the side facing away from the mirror glass (52).

6. An external rear-view mirror according to claim 1, wherein the clamping thrust bearings (55) are respectively arranged at a free end of projection (58) projecting from the support plate (51, 51').

7. An external rear-view mirror according to claim 1 wherein both the clamping thrust bearings (55) are arranged on the side of the support plate (51, 51') facing away from the mirror glass (52).

8. An external rear-view mirror for commercial vehicles comprising a holder (54) for securing the mirror to the commercial vehicle, a support plate (51, 51') arranged in a housing (67), which is secured to the holder (54) by means of a clamping device (53) and on which the housing (67) is held, at least one mirror glass (52), which is pivotably disposed on the support plate (51, 51') and which is arranged on the housing (67), and at least one positioning aggregate (60, 61), which is arranged on the support plate (51, 51') and which is connected with the at least one mirror glass (52) for its pivoting, wherein the clamping device (53) comprises a clamping thrust bearing (55) for the holder (54) and a clamping member (56), the clamping thrust bearing (55) for the holder (54) being formed in one piece with the support plate (51, 51') and the clamping member (56) being non-positively connectable with the clamping thrust bearing (55), and wherein a housing member (68) laterally defining the pivoting range of the mirror glass (52) by a wall (70) extending in the way of a frame is arranged on the support plate (51, 51') and is secured to the support plate (51, 51') with a base (69) supporting the wall (70) from the side facing away from the mirror glass (52), the clamping device (53) on the support plate (51, 51') passing through an opening (72) in the base (69) and being arranged on the rear of the base (69) facing away from the mirror glass (52), and wherein on its rear facing away from the mirror glass (52) the base (69) of the housing member (68) is provided with a cable duct (79) for a control cable, which duct (79) proceeding from the portion of the base adjacent to the clamping device (53) leads to an electric plug connector (81) arranged thereon.

9. An external rear-view mirror according to claim 8, wherein a cover (73) for covering the clamping device (53) and the base (69) of the housing member (68) is connected to, in particular locked onto, the housing member (68) from the side facing away from the mirror glass (52).

10. An external rear-view mirror according to claim 8, wherein on its rear facing away from the mirror glass (52) the base (69) of the housing member (68) is provided with a conduit-like recess (78) for the at least partial accommodation of the holder (54).

* * * * *